Dec. 13, 1966  K. A. TRICKETT ETAL  3,291,699
FUEL ELEMENT
Filed Dec. 23, 1965  2 Sheets-Sheet 1
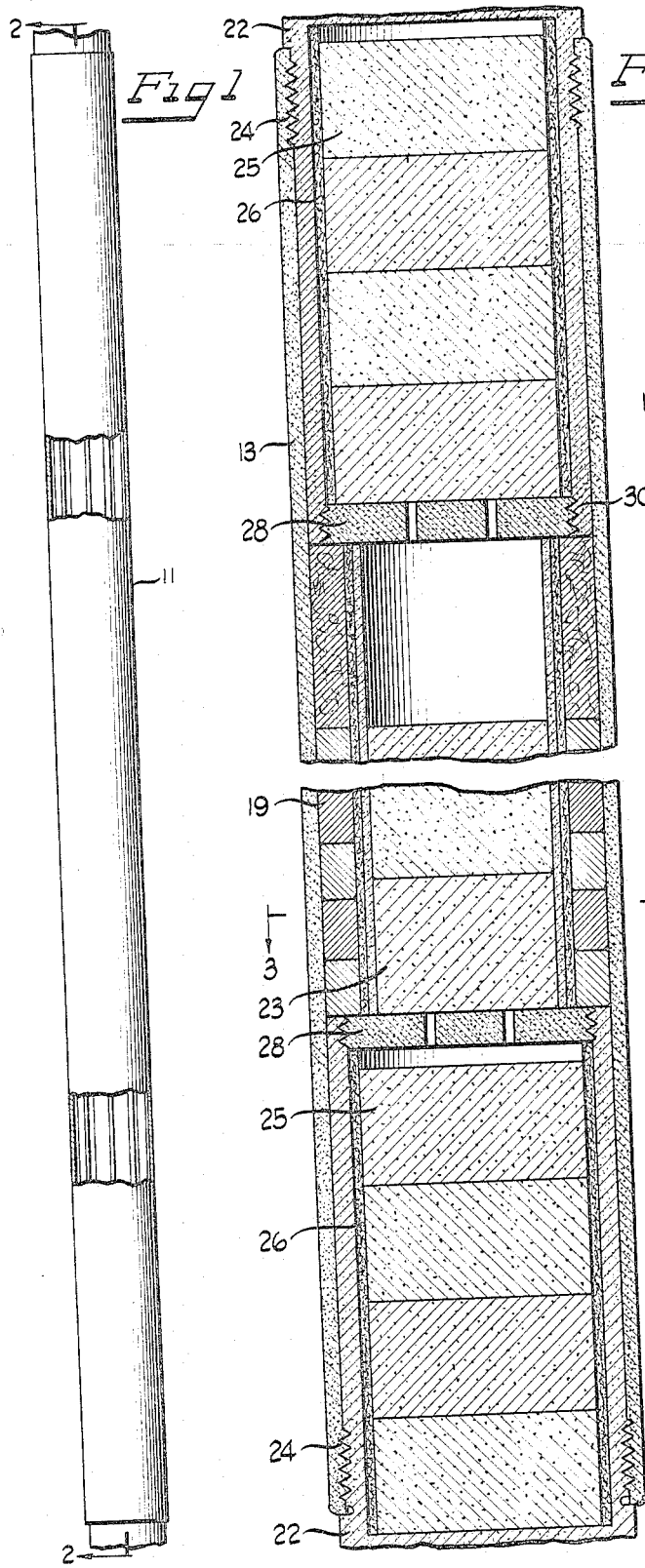
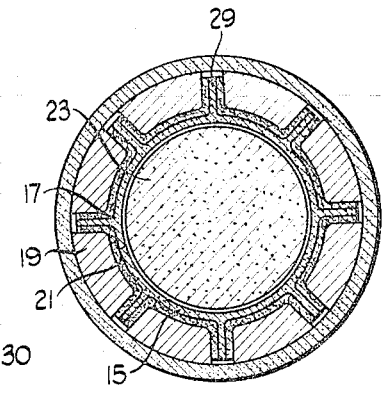
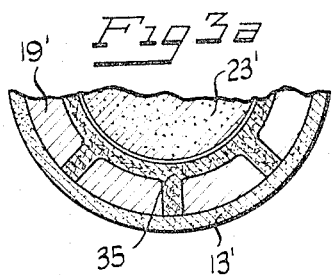
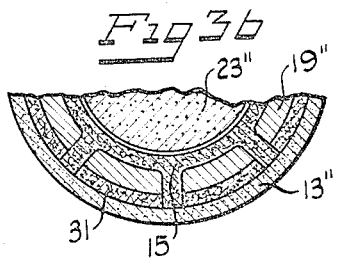
INVENTORS
KENNETH A. TRICKETT
MASSOUD T. SIMNAD
GEORGE J. MALEK
BY  *Roland A. Anderson*
ATTORNEY

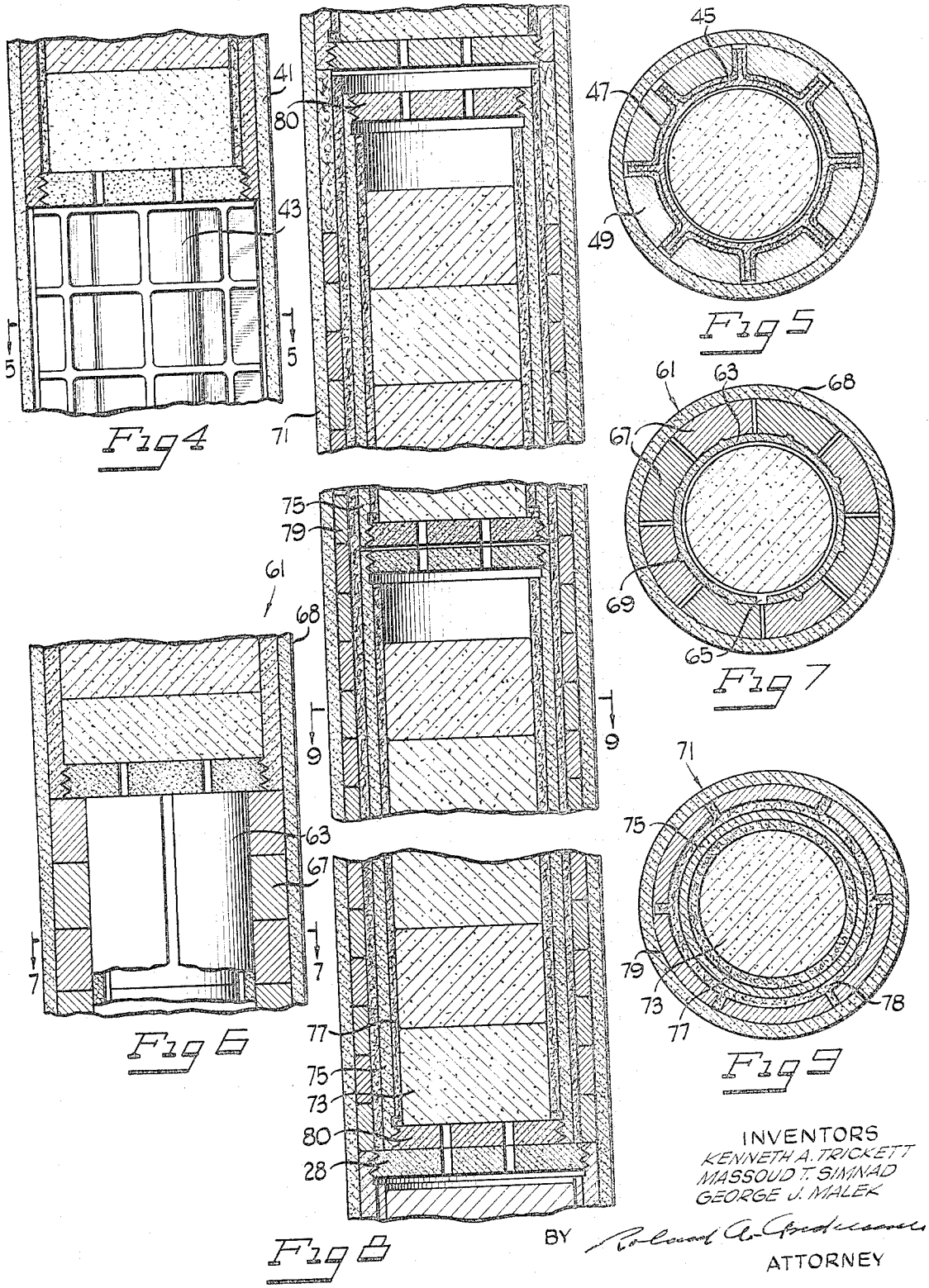

3,291,699
Patented Dec. 13, 1966

3,291,699
FUEL ELEMENT
Kenneth A. Trickett and Massoud T. Simnad, San Diego and George J. Malek, Poway, Calif., assignors to the United States of America as represented by the United States Atomic Energy Commission
Filed Dec. 23, 1965, Ser. No. 516,157
14 Claims. (Cl. 176—68)

The invention described herein was made in the course of, or under, Contract AT (04-3)-187 with the United States Atomic Energy Commission.

The invention relates to fuel elements for nuclear reactors and more particularly to fuel elements which are externally cooled, and are especially suited for use in high-conversion ratio high temperature gas-cooled reactors.

In reactors which operate at high power levels and which utilize a fluid coolant stream to transfer heat from fuel elements positioned in a reactor core, it is important that the fuel element should be structurally stable at high operating temperatures over extended periods of time and consequently should be designed so as to accommodate any mechanical stresses introduced by radiation growth, thermal expansion characteristics, or fabrication mismatches. Moreover, as in any apparatus for the generation of useful power, cost is also a significant factor. Thus, the design of the fuel element should achieve the desired stability without requiring expensive manufacturing costs. Consequently, fuel element designs should be fairly uncomplicated so as not to necessitate difficult machining or assembly operations and should have reusable parts wherever possible.

It is the principal object of the present invention to provide novel fuel elements having improved operating characteristics. It is a further object to provide fuel elements for use in high-temperature, gas-cooled nuclear reactors which provide structural stability for extended periods of time at elevated operating temperatures. Another object is the provision of fuel elements which have reusable components. A still further object is the provision of fuel elements which minimize stresses induced by radioactive growth, thermal expansion or fabrication discrepencies, and which may be inexpensively constructed.

These and other objects of the invention are more particularly set forth in the following detailed description and in the accompanying drawings wherein:

FIGURE 1 is an elevational view, partly broken away, of a fuel element embodying various of the features of the invention;

FIGURE 2 is an enlarged sectional view, partially broken away taken generally along line 2—2 of FIGURE 1;

FIGURE 3 is a sectional view taken along line 3—3 of FIGURE 2;

FIGURE 3a is a view similar to FIGURE 3 of a modified form of the fuel element of FIGURE 1;

FIGURE 3b is a view similar to FIGURE 3 of another modified form of the fuel element of FIGURE 1;

FIGURE 4 is an elevational view similar to FIGURE 2 of an alternate embodiment of a fuel element;

FIGURE 5 is a sectional view taken along line 5—5 of FIGURE 4;

FIGURE 6 is an elevational view similar to FIGURE 2 of a further embodiment of a fuel element having various features of the invention;

FIGURE 7 is a sectional view taken along line 7—7 of FIGURE 6,

FIGURE 8 is an elevational view similar to FIGURE 2 of a further embodiment of a fuel element having various features of the invention;

FIGURE 9 is a sectional view taken along line 9—9 of FIGURE 8.

A fuel element 11 is illustrated in FIGURES 1 through 3. Generally, the fuel element 11 comprises an elongated tubular body section or sleeve 13 formed from refractory material and having a central bore extending longitudinally therein. In the fueled zone, which occupies approximately the middle half of the total length of the fuel element 11, a generally cylindrical support member 15 is disposed longitudinally within the central bore of the sleeve 13 and extends the entire length of the fueled zone. The support member 15 contains a plurality of recesses 17 in its outer surfaces which accommodate compacts or segments 19 of nuclear fuel material in such a manner that the segments 19 are maintained adjacent to and in contact with the inner wall of the sleeve 13. To facilitate close contact of the segments 19 of nuclear fuel material with the sleeve 13 and also to accommodate fabrication, temperature, and radiation-induced mismatches, the support member 15 has an accommodating layer 21 of resilient or crushable material on the exterior surface.

Referring now specifically to the drawings, the fuel element 11, best seen in FIGURES 2 and 3, is of the type adapted for utilization in a high-temperature gas-cooled nuclear reactor. The external elongated sleeve 13 provides the principal heat transfer surface to the fluid coolant, which in reactor operation flows externally past the fuel element, preferably in a longitudinal direction. The sleeve 13 may be constructed of any suitable refractory material, such as graphite, that is structurally sound and dimensionally stable at high operating temperatures, e.g. about 1000° C. and above. Because at certain high power densities and high operating temperatures, the sleeves 13 may chemically react with certain coolants, it may be sometimes desirable to cover the exterior of the sleeve 13 with a suitable coating material, such as SiC. At lower power densities and lower operating temperatures, other ceramic materials may be used as sleeve materials, such as $SiO_2$ and SiC. One material considered suitable for use at most power densities and operating temperature levels is $MoBe_{12}$. The sleeve 13 may be formed by any suitable ceramic forming process, such as by extrusion.

The ends of the sleeve 13 are closed by suitable end closures 22, which, dependent on the particular reactor in which the fuel element 11 is to be used, may be shaped to accomplish suitable spacing and support, or to co-operate with grappling means. The end closures 22 are provided with threads 24 by which they are connected to the sleeve 13. The end closures 22 may be fabricated of any suitable material, such as graphite, and depending on reactor operating power densities, may be coated with a suitable coating material, such as SiC.

The top and bottom end closures 22 form reffector zones, as shown in detail in FIGURE 2, and contain unfueled reflector material 25, preferably sintered, high density BeO. The reflector material 25 may be formed as one piece or may consist of individual discs.

The reflector material 25 is separated from the inside wall of a cavity formed in the end closure by a layer of resilient or crushable material 26 which accommodates thermal and radiation expansion and dimensional mismatches of the reflector material 25. This permits the use of as-fired shapes of reflector material (as-fired for the purposes of this application means as obtained from a sintering process performed on compacts obtained from a cold pressing process performed on suitably prepared material without further machining operations). The reflector material 25 is pressed to a size such that, after allowing for shrinkage in the sintering process, it may be readily inserted into the cavities formed at the inner ends of the end closures 22. The reflector material 25 is retained in place by plugs 28 which screw into the ends of the end closures 22 and close the cavities thereof. Holes are drilled in the plugs 28 to permit equilization of gas pressure. The fueled zone is located between the two reflector zones and, as previously stated, comprises a longitudinally oriented, generally cylindrical support member 15 containing a plurality of recesses 17. Unfueled moderator material 23 is disposed within the center of the support member and the nuclear fuel segments 19 reside in the outer recesses.

In the specific embodiment shown in FIGURES 2 and 3, the support member is in the form of a splined sleeve. A suitable unfueled moderator material is located within the splined support member in the form of discs of as-fired moderator material 23. The fuel is in the form of segments 19 which make up a ring located between the exterior surface of the splined support member 15 and interior surface of the external sleeve 13. Any suitable moderator material may be used, a preferred material is BeO. The moderator material may be encased in removable cans for subsequent treatment and reuse as will be explained more fully hereinafter.

The splined support member 15 has a resilient or crushable outer layer capable of accommodating dimensional mismatches of as-fired fuel compacts 19. A resilient nature may be obtained by fabricating a rigid splined support member 15 from a suitable material that has structural integrity at nuclear reactor operating temperatures and then coating the rigid support member 15 with a layer of accommodating material 21. Suitable materials of construction include, but are not limited to, graphite, coated with crushable carbon, with graphite felt or with charcoal powder.

As used throughout this application, the term "resilient material," refers to a material which can accommodate both expansion and contraction type volumetric variation; a preferred resilient material being graphite felt, other suitable materials may aslo be used. The term "crushable material" refers to materials that can accommodate a contraction type volumetric variation but do not possess the aforementioned expansion characteristics, that is, materials that are capable only of contraction type volumetric variation, an example of which is crushable carbon. The lack of expansion capability of the crushable material may result in the occurrence of a gap when temperature decrease and contraction occur. This gap is of minor importance since it is non-existent during high temperature operating conditions when heat transfer is important.

At very high power density levels and operating temperatures, the coated exterior surface 21 of the support member 15 may react chemically with the matrix material of the fueled segments 19 with which it is in contact. Rather than accept a limitation of maximum fuel temperature or fuel element lifetime, it may be desirable to substitute other suitable low neutron capture cross-section, resilient materials, such as fibers of beryllia, zirconia, and composites of alumina for the previously mentioned materials.

In the embodiment illustrated in FIGURES 2 and 3, the accommodating layer 21 maintains uniformity in the spacing between the spline 15 and the fuel segment 19 and causes the fuel segment 19 to be held closely adjacent to the internal surface of the sleeve 13. The accommodating layer 21 permits volume variation to compensate for tolerance in the manufacturing of the various components and for subsequent reactor effects. The thickness of the accommodating layer 21 is a design detail dependent upon the properties of the lining material, the properties of the various components, and the temperature, time and flux dependence of volume changes in the components. It is believed that the layer 21 should be at least about 50 mils thick to function in the intended manner although the maximum thickness may be left to the designer to afford him additional flexibility which can aid him in optimizing the system to provide efficient performance.

As mentioned above, the layer 21 accommodates irradiation-induced growth and thermal expansion of the segments 19. With the fuel segments 19 disposed within the recesses 17 between the splines 29 in the assembled fuel element 11, the fueled segments 19 are held in contact with the inner surface of the exterior sleeve 13, thus substantially reducing gap-induced thermal losses in locations where efficient heat transfer is desired. Reduction in gap-induced thermal losses results in a lower fuel temperature and minimizes the mechanical and thermal stress induced in the external sleeve 13 which would result from non-uniformity of the gap. Accordingly, the strength of the external sleeve 13 may be utilized primarily for withstanding the thermal stress developed by driving the thermal power of the fueled segments 19 radially across the thickness of the external sleeve 13 into the external coolant stream. A further advantage is that smaller fueled segments 19 may be used which inherently reduce the effect of irradiation-induced growth.

A modified embodiment of the support member is illustrated in FIGURE 3a where, instead of the rigid support spline 15 and the accommodating layer 21, illustrated in FIGURE 3, there is employed a similarly shaped support element 35 made entirely of resilient material, such as graphite felt. The support element 35 has all the advantages of the rigid spline element with the additional benefits of reducing fabrication costs, as well as providing the capability of increasing either the amount of fuel or the amount of unfueled moderator within the same total element cross-section. This latter factor gives the designer an added degree of freedom when seeking the optimum system for a given set of conditions.

The fuel segments 19 may be composed of any suitable nuclear fuel material such as discrete particles of oxides of uranium, plutonium or thorium or combinations thereof distributed in a matrix material. The nuclear fuel particles may be coated or uncoated. Partially sintered fuel particles may be used to permit the fuel and the matrix material to contract simultaneously during the sintering process. Fuel particles produced by a sol-gel process are considered particularly desirable where the fuel compacts are cold pressed and sintered because of their ability to be sintered at 1100° C., rather than the usual higher temperature of 1700° C. This lower sintering temperature permits the fuel particles to shrink fully, several hundred temperature degrees before the matrix material has been completely sintered. The primary advantage of the resulting gap between the fuel particles and the matrix is that it permits temperature and irradiation induced growth of the fuel particles to occur without imposing an internal mechanical load on the matrix. A secondary effect resulting from the use of sol-gel particles is that there is a reduction in the amount of microcracking in the beryllia matrix about the fuel particles, which normally would result, but for the fuel particle shrinkage during sintering.

Fused uranium dioxide spherical fuel particles dispersed in a hot pressed fuel compact are also considered particularly desirable due to their excellent fission product retention characteristics. A gap is created between the fuel particle and the matrix upon cooling after sintering the fuel segment at a temperature on the order of about 1700° C. This gap is the result of the higher contraction coefficient of the fuel particle which causes the uranium dioxide fuel particle to shrink faster than the surrounding matrix.

Any suitable matrix material for the fuel segments 19 may be used which satisfies the basic requirements of the particular fuel element such as fission product retention, good thermal conductivity, and minimum interaction between fuel particles and matrix material. The preferred matrix material is BeO with an additive system.

The fuel segments 19 may be formed by any suitable process and preferably have an outer coating of on the order of about 30 mils of unfueled beryllia, which is needed to reduce the fission gas escape from surface recoil. For example, a die may be fabricated which would yield the required annular segments. The fueled beryllia is first cold pressed with a binder and the resulting compact is coated with unfueled beryllia and again pressed. Finally, the resulting fuel segment is sintered. Alternatively, because the fuel segments are uniform in cross-section throughout their length, they may be formed through extrusion and then coated with unfueled beryllia of a thickness on the order of the about 30 mils, or they may be formed through coextrusion with unfueled beryllia.

In the assembled condition, the fuel segments 19 are seated adjacent the accommodating layer 21 on the surface of the support member 15. Because of the as-fired surface condition of the fuel segments 19 and the effect of thermal distortion, there exists an anticipated equivalent gap on the order of about 2 mils or so between the fuel compacts 19 and the inner surface of the sleeve 13. As a result of using accommodating material 21, the size of the aforementioned gap may essentially be considered to be unaffected by variations in temperature. The fabrication mismatches of the remaining surfaces of the as-fired fuel compact that is, those surfaces which are in direct contact with the resilient material, are accommodated by the volume variation capability of the resilient material.

When placed in position in the external sleeve 13, the fuel segments 19 exert a slight radial force against the internal surface of the sleeve 13. The radial force exerted by the fuel segments 19 on the internal surface of the sleeve 13 is believed to increase with temperature and will increase as a result of irradiation-induced volumetric changes. However, the resulting radial load, which will be on the order of about one p.s.i. or so, may be considered negligible. The ability to consider the aforementioned load as negligible stems from a proper selection of the accommodating layer 21. A material should be chosen which has soft spring curve characteristics such that large deflections will yield small forces. The layer 21 accommodates irradiation growth and thermal expansion of the fuel element components and eliminates the possibility of cracks occurring in the sleeve 13 from excessive structural loads brought on by volumetric variation.

The irradiation-induced volumetric growth of the beryllium oxide has been found to be a function of the neutron dose and the temperature. It has been found that for beryllia there is a certain temperature on the order of about 700° C., below which there is a relatively large increase in volumetric growth as a function of neutron dosage and above which the effect of neutron dosage on the volumetric growth of the beryllia is substantially reduced. If the overall beryllia temperature is maintained above this desired value, the irradiation induced volumetric growth of beryllia may be kept to a minimum. Through a reduction in irradiation-induced growth of the fuled beryllia, the internal microcracking in the fueled beryllia matrices, which results during the lifetime of a fuel element is substantially reduced and often eliminated. This in turn prevents an increase in fission product contamination of the coolant near the end of the fuel element's lifetime. The over-all result of these factors may be a significant cost reduction in the primary coolant cleanup system.

As illustrated in FIGURE 3b, one method for accomplishing the aforementioned internal fuel element temperature control is by placing an insulating layer 31 between the fuel segment 19″ and the inner wall of the sleeve 13″. The low thermal conductivity of the insulating layer 31 provides a barrier to heat transfer thereacross. The temperature at that particular longitudinal location within the fuel element is higher because of the increased thermal resistance between the fuel and the sink temperature of the coolant.

Any suitable insulating material of a desired thermal conductivity may be employed. Additional resilient material may be used between the fuel segment 19″ and the inner surface of the sleeve 13″. In such an instance, the additional resilient material also aids in compensating for variations in the as-fired fueled bodies, and accommodating the thermal expansion and the irradiation-induced volumetric growth.

The amount of insulating material 31 to be used for the accomplishment of thermal control will vary along the length of the fuel element from those regions where the normal operating temperature is already above the desired value and no insulation is required to those regions of the fuel element where the amount of insulating material to be used depends upon the temperature increment of increase desired.

In addition to being useful with components made of beryllia, it is believed that the concept of employing an insulating material 31 as a heat barrier through which the heat must pass in traveling from fissionable fuel to the surface from which it is transferred to the coolant stream, may well have similar application to other systems. The dimensional growth of materials during long exposure to high temperature and high density irradiation is a problem which is being investigated in the case of various structural materials. For example, it is known that graphite undergoes dimensional changes as a result of extended residence in such an environment. Accordingly, such an insulating material may well prove advantageous to provide a heat flow barrier adjacent graphite or graphite matrix material to thereby maintain the graphite above a certain temperature to reduce irradiation-caused growth.

The advantage of effective minimization of irradiation-induced volumetric growth of the unfueled beryllia may also be of significant import when concerned with the unfueled beryllia, primarily that which is used in the reflector areas 25 of the fuel element. It may be desirable to locate a layer 26 of accommodating material laterally between the unfueled beryllia reflector 25 and the inner wall of the end closures 22. An accommodating material 26 in this location reduces the structural loads by growth absorption, that is, its flexible volume compensates for volumetric changes through a reciprocal variation in its volume. Likewise, it may be desirable to employ a layer of accommodating material between the lateral surfaces of the moderator discs 23 and the inner cylindrical surface of the support member 15 to reduce structural stresses which might be caused by the irradiation-induced volumetric growth of the discs 23.

An alternative embodiment, fuel element 41, as illustrated in FIGURES 4 and 5. In this embodiment, a grid or waffle arrangement of individual cells 43 is formed on the exterior surface of a generally cylindrical support member 45. A layer of resilient material 47 is formed on the exterior surface of each cell 43, in the manner previously described. Individual fuel segments 49 reside in each of the cells 43. This arrangement leads to excellent structural integrity at high operating temperatures, at some sacrifice in fabrication simplicity. Since the top and bottom surfaces of the fuel segments 49 do not have to mate, an even wider latitude of fabrication mismatch is permissible with this embodiment, and longitudinal stress induced by thermal expansion or irradiation growth of the fuel segments 49 is relieved.

A further embodiment, fuel element 61, is illustrated in FIGURES 6 and 7 in which a longitudinally oriented, externally ribbed, split tube 63 is employed as the internal support member. In this embodiment, irradiation growth and thermal expansion are accommodated by exerting a bending stress on the split tube 63 causing a gap 65 of the tube to substantially close at reactor operating conditions. The split tube 63 is so designed that any bending stress is limited to deflections imposed by irradiation growth and thermal expansion of fuel segments 67. A further advantage of the split tube support member 63 is that bending stresses developed in the external sleeve 68 by non-uniform circumferential temperature distributions caused by gaps between fuel segments 67 are reduced. Ribs 69 are provided on the split tube 63 to prevent any circumferential sliding or stackup of the fuel compacts and thus reduce the maximum circumferential bending stress induced by formation of a gap between fuel segments 67.

A further embodiment, fuel element 71, is illustrated in FIGURES 8 and 9 wherein means are provided for removal and reuse of the beryllia moderator material after the fuel element 71 has been dismantled.

In beryllia-moderated reactors, lithium is formed by neutron bombardment of $Be^9$ which decays to $Li^6$ giving off an alpha particle. The rate of lithium buildup being dependent on the average fission energy for the reactor core. For some cores, the reactivity life time characteristic is such that the presence of lithium, with its 71 barn capture cross-section, is detrimental at the start of life. An example of this would be a core with a Pu:Th:BeO ratio of 1:4:994 and a $Pu^{240}$ isotopic enrichment of 17 percent. This means that the reactor core nuclear design requires beryllia with an insignificant amount of lithium present each time the core is recharged with fuel. Of course, one way to accomplish this would be to replace the unfueled beryllia each time the fueled beryllia is changed.

Lithium may be released by annealing beryllia in the temperature range 1200° C. to 1700° C. for a sufficient period of time. Fuel element 71 incorporates a provision for conveniently removing the beryllia moderator material at the time of disassembly so that the unfueled beryllia may be treated in an annealing furnace for lithium cleanup.

As shown in FIGURE 8, unfueled beryllia discs 73 are encapsulated within a removable canister 75 of graphite or other suitable material. The beryllia discs 73 are separated from the inner wall of the canister by a layer of accommodating material 77 which serves the function previously described. The canisters 75 reside in the central bore provided within a splined support member 78 fabricated of resilient material which provides recesses wherein fuel segments 79 are disposed. The canisters 75 containing beryllia moderator 73 are held in place in the central bore of the support member 78 by retaining discs 80. After treatment for lithium cleanup, the canisters 75 are re-assembled into fuel elements 71.

The following example further illustrates one method of making a fuel element embodying various of the features of the invention, but is intended to in no way limit the scope of the invention, which is defined in the appended claims.

*Example*

A generally cyclindrical fuel element of a type suitable for use in a high-temperature gas-cooled nuclear reactor, using helium as a coolant, is made having a 4.0 inch diameter as measured across the external sleeve.

An external sleeve 13, end closures 22 and retaining discs 28, are made from graphite having a density of about 1.8 gm. per $cm.^3$. The sleeve 13 has an inner diameter of about 3.25 inches and an outer diameter of about 4.0 inches; it is about 11 feet long. The sleeve 13 and the end closures are coated on the exterior surface with SiC to a depth of $\frac{1}{32}$ inch using a vapor disposition process. Threads are cut on the inner surface at both ends of the sleeve and mating threads are cut on the exterior surface of the end closures. The end closures also have threads cut on the internal surface at the end for engaging retaining discs 28.

A generally cylindrical support member 15 is prepared from graphite felt having a density of 0.086 gm. per $cm.^3$. The support member 15 has a central bore 2.25 inches in diameter and has eight evenly spaced splines projecting from an outer surface having a nominal diameter of about 2.5 inches. The diameter across opposite splines is about 3.25 inches and the width of the splines is about 0.125 inch.

Two cylindrical sleeves 26 are prepared from graphite felt. The sleeves have an outer diameter and length equal to the inner diameter and depth of the hollow portion of the top and bottom end closures 22. The inner diameter is 2.25 inches, the same as the diameter of the central bore of the splined support member. This permits the same diameter beryllia discs to be used in both the moderator and reflector regions of the fuel elements.

Right cylindrical beryllia discs are prepared by well-known cold pressing and sintering methods. The outer diameter is such that, after allowing for shrinkage the discs are small enough to fit inside the graphite felt spline 15 and sleeves 26.

Fuel segments 19 are prepared by a cold press processing method. Sol-gel particles of a $ThO_2:UO_2$ fuel mixture in the ratio 12:1 parts by weight, and having an average particle size of 200 microns are uniformly coated with BeO slurry while the particles are being tumbled. A coating of sufficient thickness is applied so that the fuel particles comprises 25 percent by volume of the sintered matrix. The coated particles are cold pressed at a pressure of 83,000 p.s.i. into fuel segments 19. After forming, the green fueled segments 19 are first heat treated at a relatively low (600°–900° C.) temperature in an oxidizing atmosphere to remove any organic binding materials used in the forming process. The fuel segments are then fully sintered in a hydrogen atmosphere furnace at a temperature of 1700° C. The fuel segments are then placed in the recesses formed by the splines of the annular support member; no further fabrication or machining is required. Any dimensional mismatches induced by shrinkage differentials in the sintering operation are accommodated in the resilient layer of the support member.

The top and bottom end closures 22 are assembled by placing the graphite felt sleeves into the hollow portion of the end closures and then stacking beryllia discs to within $\frac{3}{16}$ inch of the top of the sleeve. Retaining discs 28 are then screwed into place. The bottom end closure 22 and the external sleeve 13 are screwed together and the splined support member 15, which is preassembled as a sub-assembly containing beryllia discs 23 within the central bore and fueled beryllia segments 19 within the recesses formed by the spines 17, is then carefully inserted into the center bore of the sleeve 13 until it comes to rest on top of the retaining disc 26 of the bottom end closure 22. The top end closure 22 is then screwed onto the sleeve 13 and the fuel element is ready for use in a nuclear reactor.

The fuel element, as described has substantially improved accommodation characteristics for dimensional mismatches and thermal and irradiation induced growth and can be advantageously used in high-temperature gas-cooled nuclear reactors.

Various of the features of the invention are set forth in the following claims.

What is claimed is:

1. A fuel element for a nuclear reactor, which fuel element comprises an elongated, tubular body section formed of refractory material, a generally cylindrical support member disposed longitudinally within said tubular body section, said support member forming therein a plurality of recesses, nuclear fuel compacts disposed in said recesses, and means for accommodating thermal expansion and irradiation growth including a layer of material disposed between said nuclear fuel compacts and said support member.

2. A fuel element in accordance with claim 1 wherein said generally cylindrical support member has a plurality of longitudinally disposed angularly spaced fins radiating from the exterior surface thereof.

3. A fuel element in accordance with claim 2 wherein said support member has a central bore and nuclear moderator material is disposed within said central bore.

4. A fuel element in accordance with claim 1 wherein said elongated tubular body section is graphite and wherein said layer of accommodating material is selected from the group consisting of graphite felt, crushable carbon, charcoal powder and beryllia fibers.

5. A fuel element in accordance with claim 1 wherein said nuclear fuel compacts are formed from a mixture of nuclear fuel particles dispersed in a beryllia matrix.

6. A fuel element in accordance with claim 3 wherein said moderator material comprises beryllia discs.

7. A fuel element in accordance with claim 1 wherein said splined generally cylindrical support member is formed of resilient material selected from the group consisting of graphite felt, crushable carbon, charcoal powder, and beryllia fibers.

8. A fuel element in accordance with claim 1 wherein said support member is formed from a material selected from the group consisting of graphite felt, crushable carbon, charcoal powder, and beryllia fibers.

9. A fuel element in accordance with claim 1 wherein said accompanying means also includes a layer of material disposed between said nuclear fuel compacts and said elongated tubular support member so that said nuclear fuel compacts are maintained above a predetermined temperature during reactor operation.

10. A fuel element in accordance with claim 2 wherein said support member also includes transversely disposed fins spaced along the exterior length thereof, the combination of said longitudinal fins and said transverse fins forming a plurality of cellular recesses on the exterior surface of said support member.

11. A fuel element in accordance with claim 1 wherein said generally cylindrical support member disposed longitudinally within said tubular body section is a cellular member, the cells of which form said plurality of recesses into which said nuclear fuel compacts are disposed, and wherein said accommodating means includes a layer of resilient material disposed between said nuclear fuel compacts and said support member.

12. A fuel element in accordance with claim 1 wherein said support member is a longitudinally split tubular member which maintains said nuclear fuel compacts adjacent the inner wall of said body section, and wherein said support member is formed from refractory material and has longitudinal ribs which space said nuclear fuel compacts circumferentially around the inner wall of said body section.

13. A fuel element in accordance with claim 12 wherein nuclear moderator material is disposed longitudinally within said support member.

14. A fuel element in accordance with claim 13 wherein said elongated tubular body section is formed from graphite, wherein said longitudinal slit is of sufficient width to permit diametrical contraction of said support member sufficient to accommodate diametrical growth, fabrication, and thermal stresses of said fuel element, and wherein said nuclear moderator material is beryllia discs.

References Cited by the Examiner

UNITED STATES PATENTS

| 2,941,933 | 6/1960 | Roake et al. | 176—73 X |
| 3,022,240 | 2/1962 | Bassett | 176—68 |
| 3,072,555 | 1/1963 | Barth et al. | 176—83 X |
| 3,085,059 | 4/1963 | Burnham | 176—73 |
| 3,135,665 | 6/1964 | Koutz et al. | 176—90 X |
| 3,230,150 | 1/1966 | Martin et al. | 176—68 |
| 3,235,463 | 2/1966 | Sandkovich | 176—78 X |

FOREIGN PATENTS 798,282  7/1958  Great Britain.

BENJAMIN R. PADGETT, *Primary Examiner.*

M. J. SCOLNICK, *Assistant Examiner.*